April 23, 1946.  W. T. TRICE  2,399,076
HELICOPTER
Filed Sept. 13, 1943  7 Sheets-Sheet 1
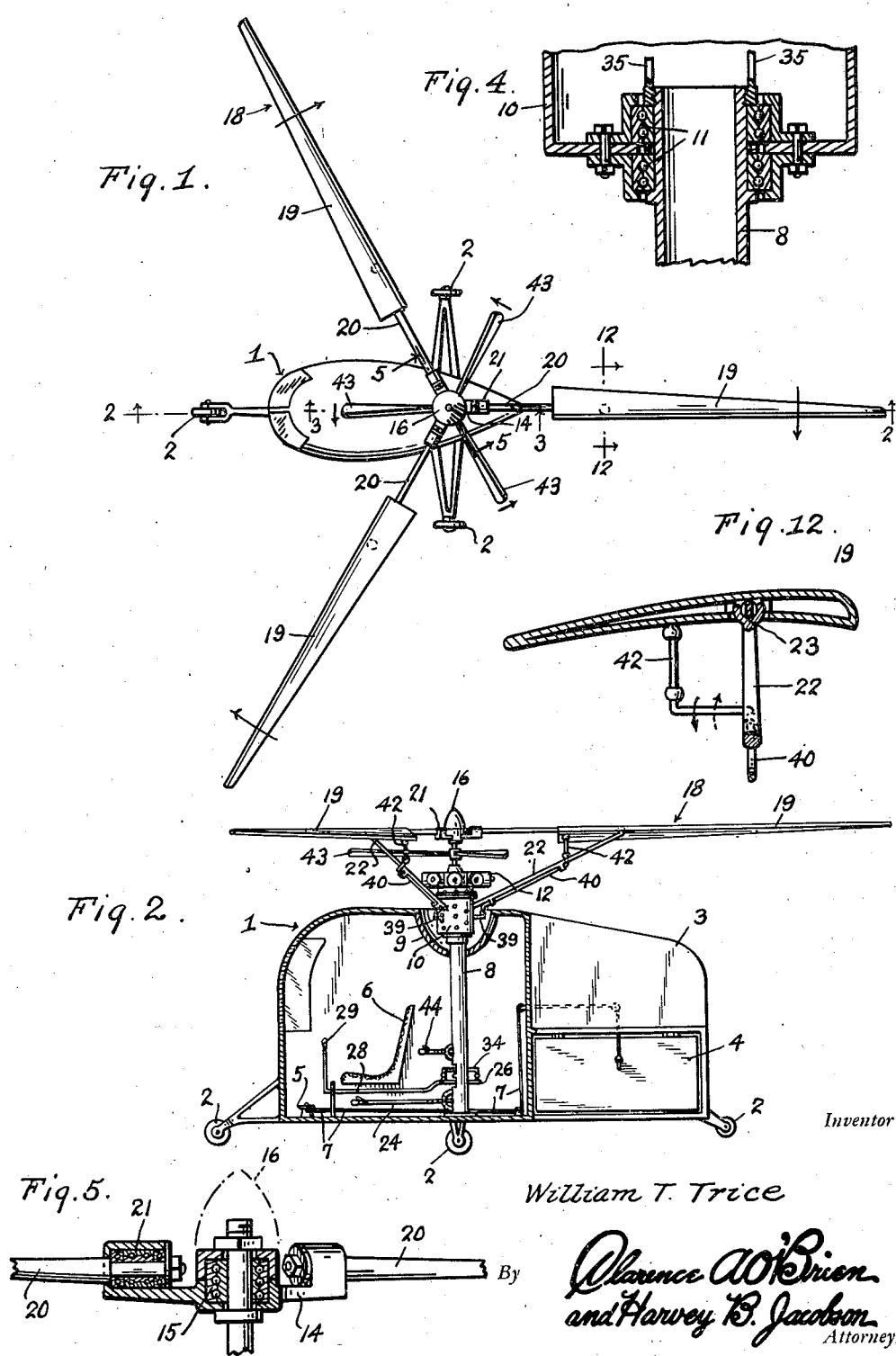
Inventor
William T. Trice
By Clarence A. O'Brien
and Harvey B. Jacobson
Attorneys April 23, 1946. W. T. TRICE 2,399,076
HELICOPTER
Filed Sept. 13, 1943 7 Sheets-Sheet 2
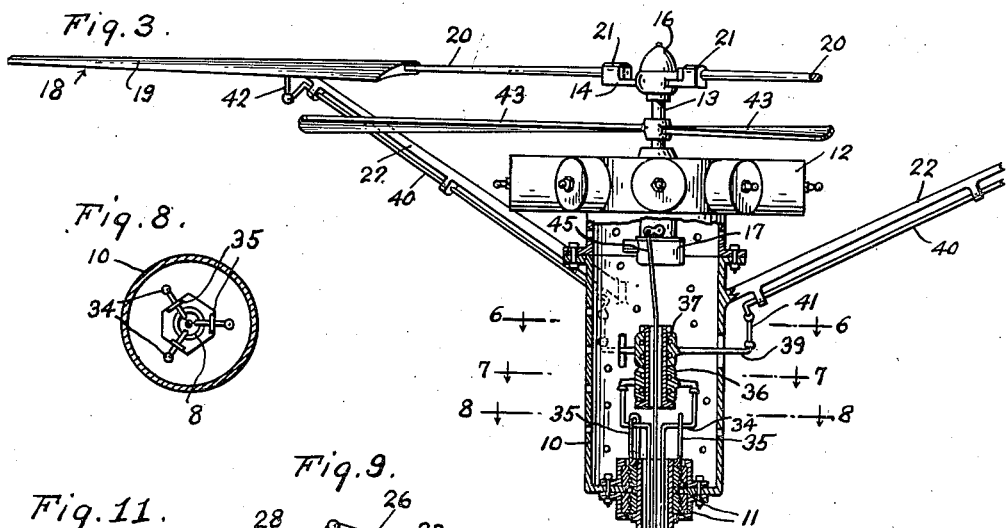
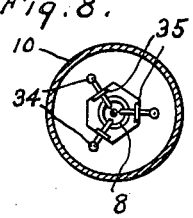
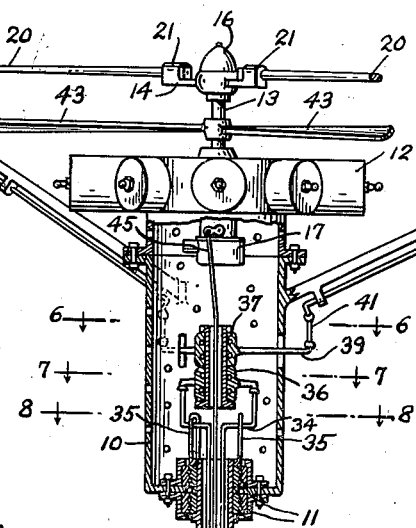
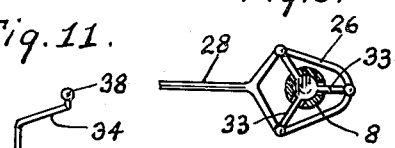
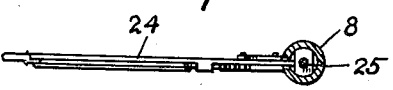
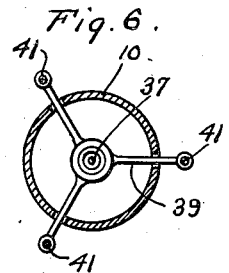
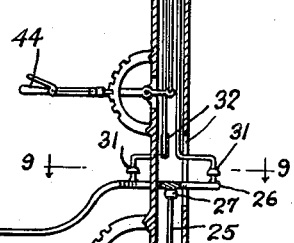
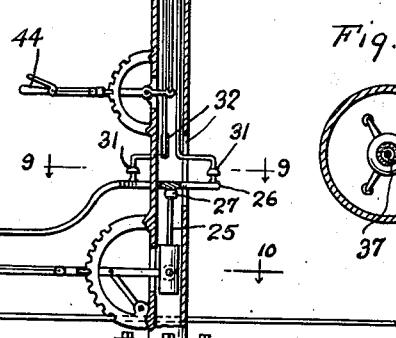
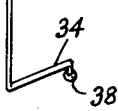
Inventor
William T. Trice
By Clarence A. O'Brien
and Harvey B. Jacobson
Attorneys

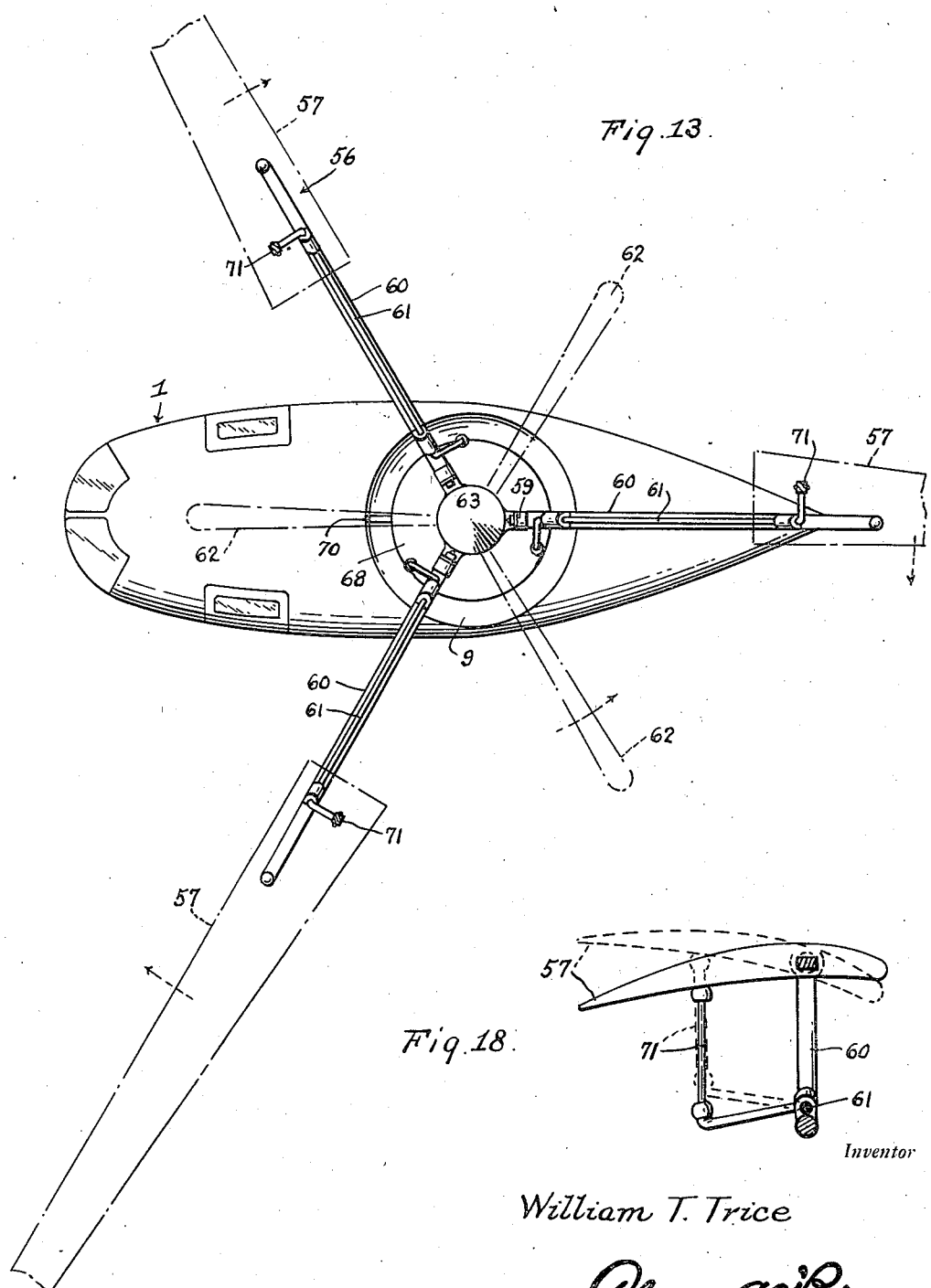

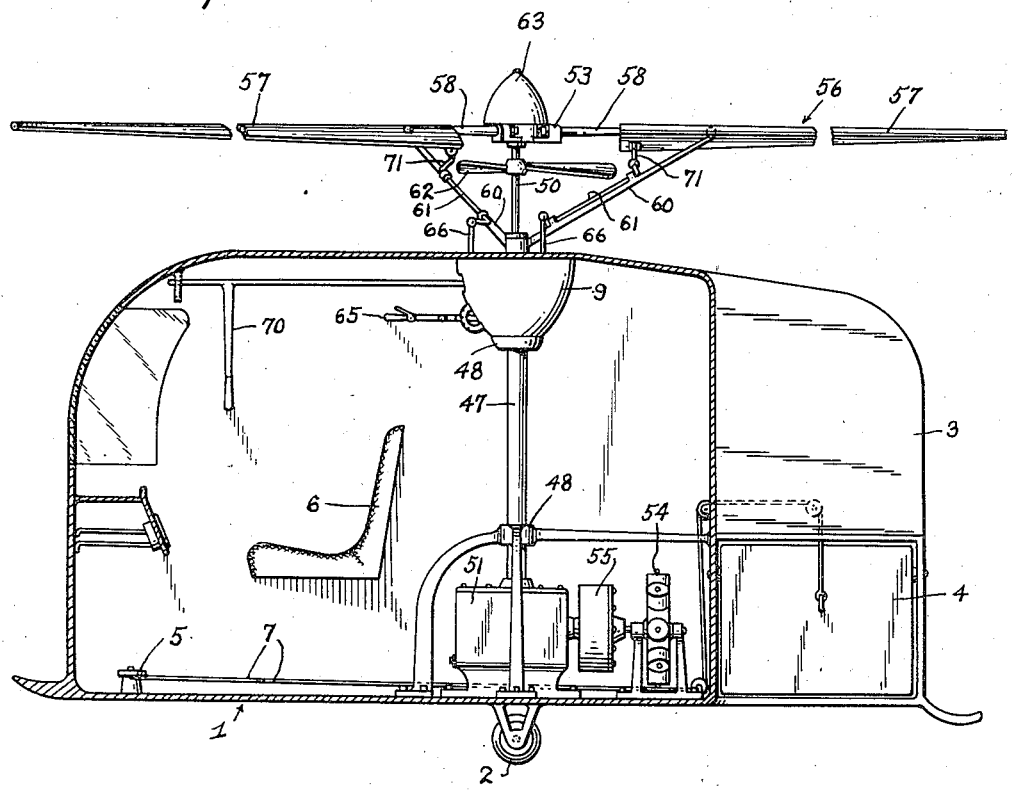

Inventor
William T. Trice
By Clarence A. O'Brien
and Harvey B. Jacobson
Attorneys

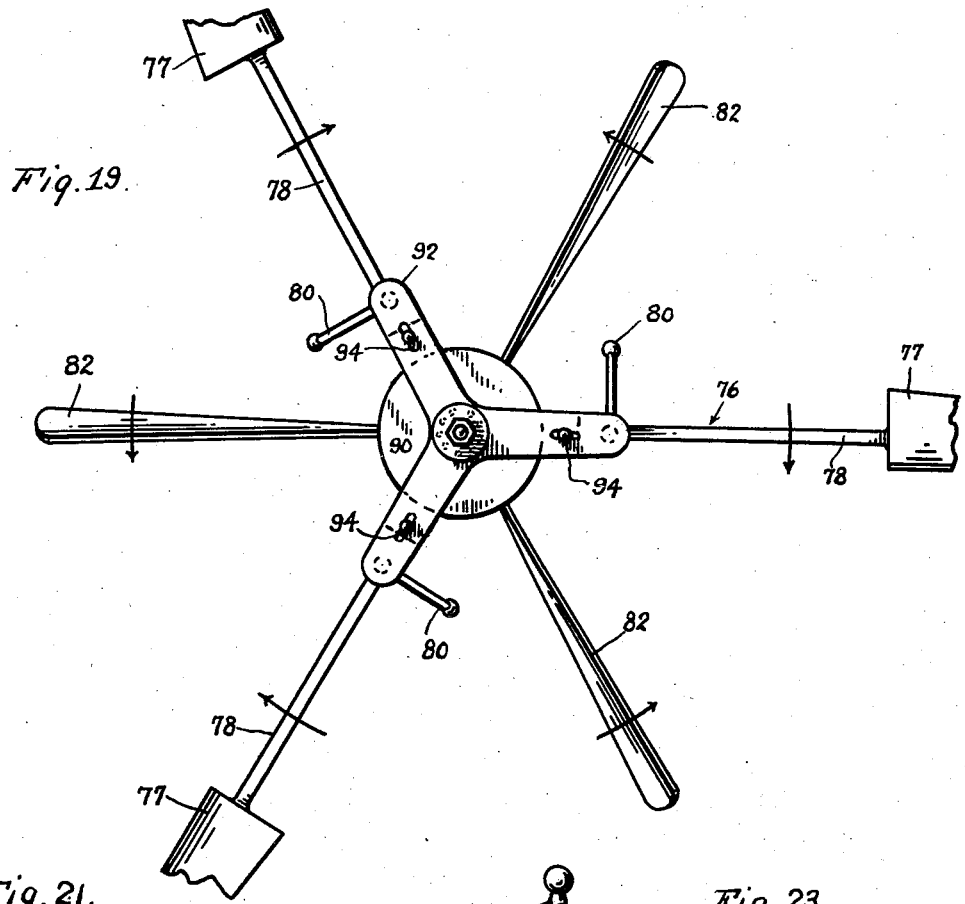
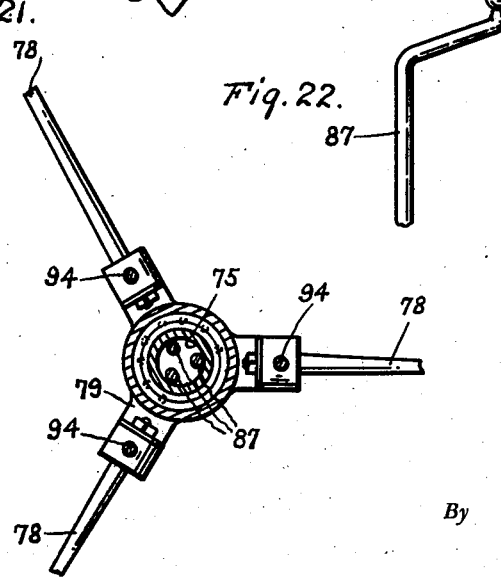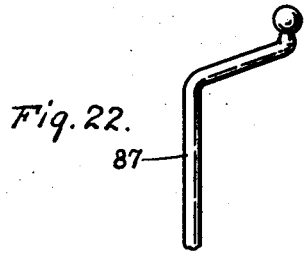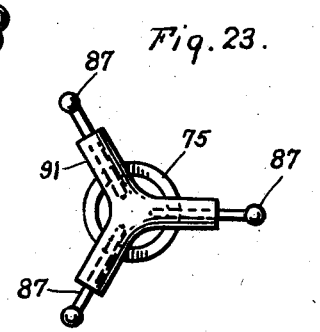

April 23, 1946.   W. T. TRICE   2,399,076
HELICOPTER
Filed Sept. 13, 1943   7 Sheets-Sheet 7

Inventor
William T. Trice

By Clarence A. O'Brien
and Harvey B. Jacobson
Attorneys

Patented Apr. 23, 1946

2,399,076

UNITED STATES PATENT OFFICE 2,399,076

HELICOPTER

William T. Trice, Mobile, Ala.

Application September 13, 1943, Serial No. 502,204

2 Claims. (Cl. 244—17)

The present invention relates to new and useful improvements in heavier-than-air flying machines of the helicopter type, and has for its primary object to provide, in a manner as hereinafter set forth, a craft of this character comprising a novel combination and arrangement of oppositely turning rotor and propeller for ascending and descending.

Another very important object of the invention is to provide a helicopter of the aforementioned character which embodies a unique power plant arrangement and means operatively connecting said power plant to the rotor and the propeller.

Still another very important object of the invention is to provide a helicopter of the character described comprising novel control means whereby the craft may be readily caused to travel in any desired direction.

Other objects of the invention are to provide a helicopter of the character set forth which will be comparatively simple in construction, strong, durable, reliable in operation, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a top plan view of a helicopter constructed in accordance with the present invention.

Figure 2 is a view in vertical longitudinal section through the machine, taken substantially on the line 2—2 of Figure 1.

Figure 3 is a view in vertical section through the driving and control mechanism, taken substantially on the line 3—3 of Figure 1.

Figure 4 is a fragmentary view in vertical section, showing the mounting of the rotary casing or housing on the stationary tubular standard or post.

Figure 5 is a vertical sectional view, taken substantially on the line 5—5 of Figure 1, showing the connections of the rotor blade shafts to the upper end portion of the crankshaft of the engine.

Figures 6 to 10, inclusive, are views in horizontal section, taken substantially on the lines 6—6 to 10—10, respectively, of Figure 3.

Figure 11 is a detail view of one of the vertically moving feathering rods.

Figure 12 is a cross-sectional view through one of the rotor blades, taken substantially on the line 12—12 of Figure 1.

Figure 13 is a top plan view of another form of the invention.

Figure 14 is a view in side elevation of the modification of Figure 13, showing the fuselage or cabin in longitudinal section.

Figure 15:
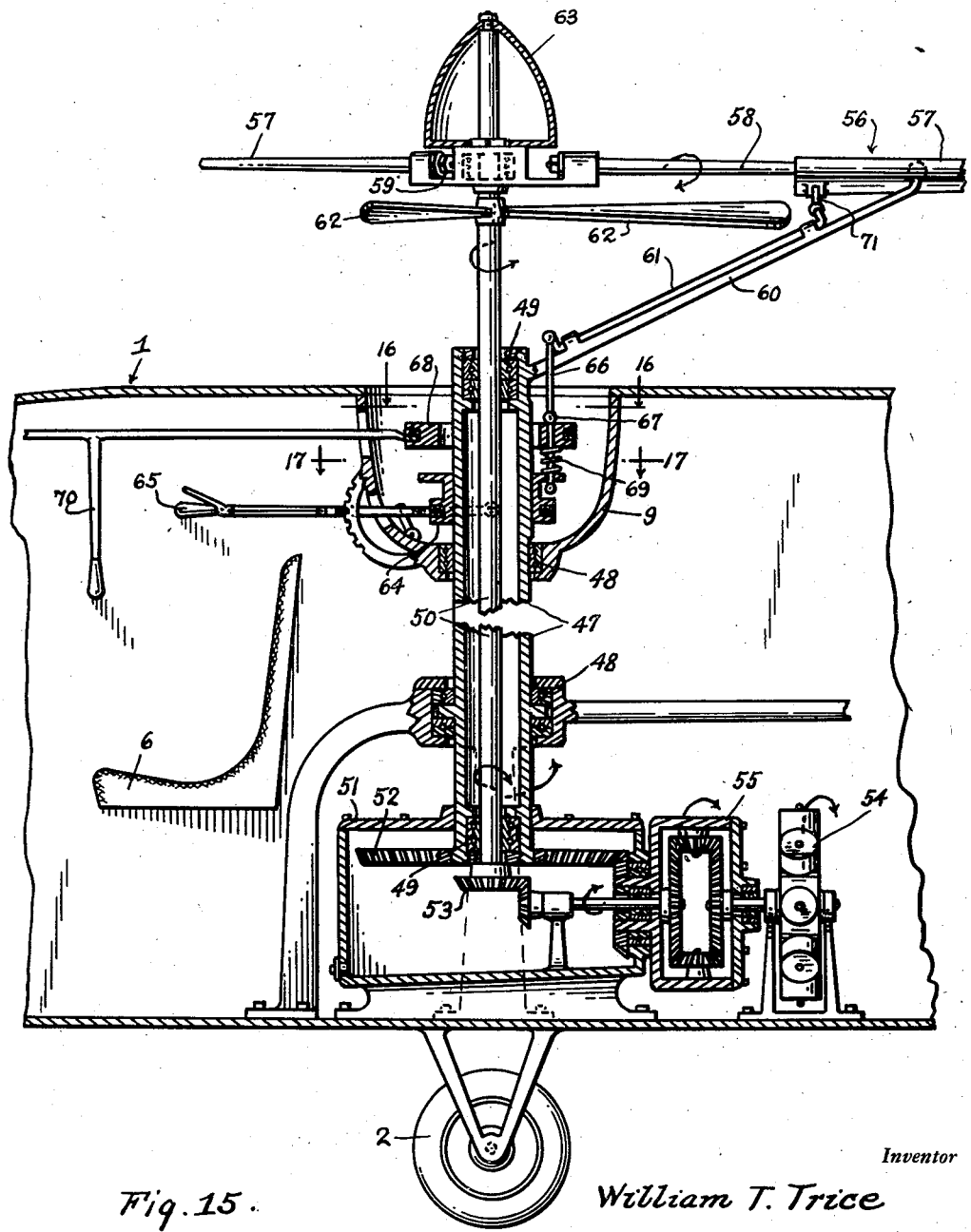

Figure 15 is a view in vertical section through the propulsion and control mechanism of the modification.

Figures 16 and 17 are views in horizontal section, taken substantially on the lines 16—16 and 17—17, respectively, of Figure 15.

Figure 18 is a cross-sectional view through one of the rotor blades of the modification.

Figure 19 is a top plan view, showing another form of the machine.

Figure 20:
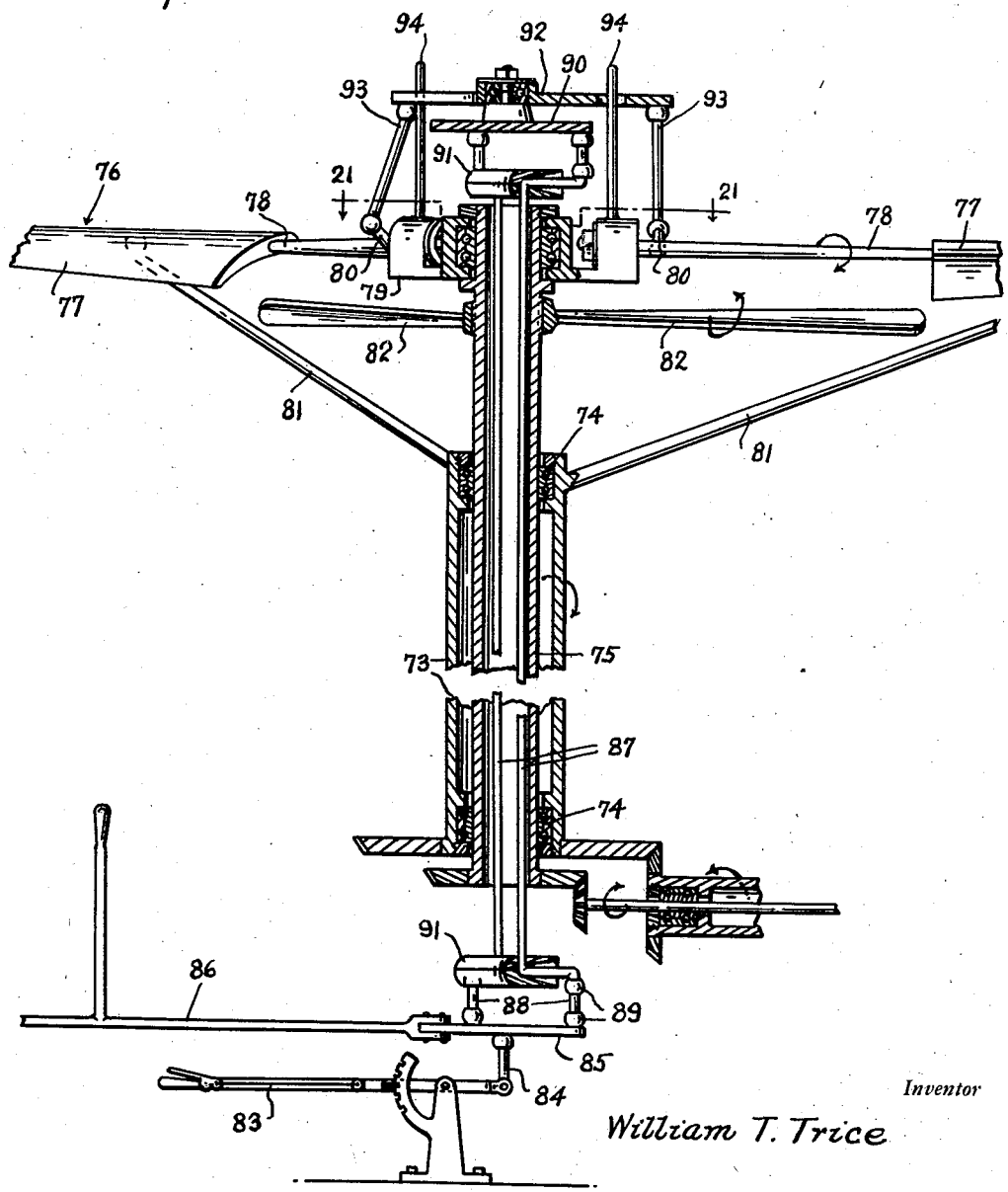

Figure 20 is a view in vertical section through the embodiment of Figure 19.

Figure 21 is a view in horizontal section, taken substantially on the line 21—21 of Figure 20.

Figure 22 is a perspective view of the upper end portion of one of the vertically movable feathering rods shown in Figure 20.

Figure 23 is a top plan view, showing the means for securing the feathering rods together.

Referring now to the drawings in detail, and to Figures 1 to 12, inclusive, thereof, in particular, it will be seen that reference character 1 designates generally a fuselage or cabin, which fuselage or cabin may be of any desired dimensions and material. Suitable landing wheels 2 are provided for the cabin 1. Projecting rearwardly from the cabin 1 is a stabilizer 3. Below the stabilizer 3, a rudder 4 is hingedly suspended for vertical swinging movement from side to side. A foot lever or bar 5 in the cabin 1, forwardly of the pilot's seat 6, is operatively connected to the rudder 5 by means including cables 7.

Mounted vertically in the cabin 1 is a tubular post 8 which projects through a concavity 9 in the top of said cabin. Journaled on the upper end portion of the tubular post 8 and rising therefrom is a cylindrical perforated housing 10. Ball bearings 11 (see Fig. 4) are provided between the housing 10 and the post 8. Fixed vertically on the upper end of the housing 10 is a radial engine 12 having an upwardly projecting crankshaft 13. The engine 12 is of the type shown in the U. S. patent to M. A. Tips, No. 1,306,035 dated June 10, 1919, in which the cylinders and crankshaft of the engine rotate in opposite directions. A spider 14 is journaled on the upper end portion of the vertical engine crankshaft 13. As best seen in Figure 5 of the drawings, a suitable ball bearing 15 is provided for the spider 14 on the crankshaft 13. A fuel tank 16 is mounted on the spider 14. The fuel tank 16 may be connected in any suitable manner to the carburetor 17 of the engine 12 as, for example, through a duct in the crankshaft 13.

Mounted on the spider 14 and the housing 10 for operation in a horizontal plane is a rotor which is designated generally by reference numeral 18. The rotor 18 includes feathering blades 19 fixed on shafts 20 having one end portion journaled in bearings 21 which are provided therefor on the legs of the spider 14. The rotor 18 further includes struts 22 which are fixed on the housing 10 and which extend radially and upwardly therefrom. The rotor blades 19 are rockably connected at 23 (see Fig. 12) to the outer ends of the struts 22.

Pivotally mounted on the lower portion of the tubular post 8 is a vertically swinging hand lever 24. One end portion of the lever 24 is operable in the post 8 and pivotally mounted thereon and extending upwardly therefrom is a rod 25. A frame 26 is rockably mounted on the upper end of the rod 25 through the medium of a ball and socket connection 27. The frame 26, which encircles the post 8, is fixed on one end of a lever 28 comprising an upstanding handle 29.

Vertically movable feathering rods 30 in the tubular post 8 are operatively connected, at their lower ends, to the frame 26 by ball and socket connections 31. Slots 32 in the lower portion of the post 8 accommodate the lower portions of the rods 30 and the elements 33 of the frame 26.

The rods 30 terminate in angular upper end portions 34 which are operable vertically in substantially U-shaped, upstanding guides 35. Mounted on the upper end portions 34 of the rods 30 is a vertical bearing 36 having journaled therein a tubular spindle 37. Ball and socket connections 38 connect the rods 30 to the bearing 36 for universal movement.

Journaled on the upper portion of the tubular spindle 37 is a spider 39. Rods 40 are rockably mounted on the struts 22. Links 41 operatively connect the spider 39 to the rods 40. The rods 40, in turn, are operatively connected to the rotor blades 19 for feathering said blades by links 42 (see Fig. 12).

Fixed on the crankshaft 13 of the engine 12 for rotation with said crankshaft is a propeller 43. The propeller 43, it will be observed, is located substantially within the confines of the blades 19 of the rotor 18.

A hand throttle lever 44 is pivotally mounted for vertical swinging movement on the tubular post 8. One end portion of the lever 44 is operable in the post 8. A rod 45 operatively connects the lever 44 to the throttle valve of the engine 12, said rod passing upwardly through the tubular post 8 and the tubular spindle 37.

It is thought that the operation of the machine as thus far described will be readily apparent from a consideration of the foregoing. Briefly, the rotor 18 turns in unison with the cylinders of engine 12 while the propeller 43 is rotated in the opposite direction with the crankshaft 13 of said engine. Thus, the machine is caused to ascend or descend and torque is substantially eliminated. The control surfaces 3 and 4 receive the downward blast or "wash" from the rotor 18. The machine may be readily tilted through the medium of the surface 4. By actuating the lever 24 for raising or lowering the assembly in the tubular post 8 and the housing 10, the pitch of all of the rotor blades 19 may be uniformly and simultaneously adjusted as desired. By swinging or rocking the lever 28, the spider 39 may be inclined in any direction through the medium of the rods 30. In this manner the rotor blades 19 may be caused to feather at any point in their cycle for causing the machine to travel in any desired direction.

In the embodiment illustrated in Figures 13 to 18, inclusive, of the drawings, a vertical tubular shaft 47 is journaled in bearings 48 which are provided therefor in the fuselage 1. Journaled in bearings 49 which are provided therefor in the tubular outer shaft 47 is an inner shaft 50. The shafts 47 and 50 extend downwardly into a case 51 in the cabin 1 and have fixed thereon comparatively large and small gears 52 and 53, respectively. An engine 54 is mounted in the fuselage or cabin 1 rearwardly of the case 51 and drives the gears 52 and 53 through means including an equalizing gear unit 55 for rotating the shafts 47 and 50 in opposite directions.

The inner shaft 51 projects above the tubular outer shaft 47.

Fixed on the upper portion of the tubular outer shaft 47 and rotatable about the inner shaft 50 is a rotor 56. The rotor 56 includes blades 57 on shafts 58 having one end portion rotatably connected to a spider 59 which is journaled on the inner shaft 50. The blades 57 are rockable on struts 60 which are fixed on the tubular outer shaft 47 and which extend radially and upwardly therefrom. Shafts 61 are rockably mounted on the struts 60 and connected to the blades 57 for adjusting the pitch thereof.

A propeller 62 is fixed on the shaft 50 below the spider 59. Mounted on the upper end portion of the inner shaft 50 is a spinner 63.

A flanged ring 64 is slidably mounted on the tubular outer shaft 47 in the portion 9 of the top of the cabin 1. A hand lever 65, within convenient reach of the pilot occupying the seat 6, is operatively connected to the slidable ring 64. Linked rods 66 operatively connect the slidable ring 64 to the shafts 61 for feathering the rotor blades 57. The links or sections comprising the rods 66 are coupled by ball and socket connections 67. The lower end portions of the rods 66 are slidably anchored in the flanged ring 64.

Rockably encircling the tubular outer shaft 47, above the ring 64, is a ring 68. The ring 68 is slidably mounted on the lower links or sections of the rods 66 and is engaged beneath the joints 67 thereof through the medium of coil springs 69. The ring 68 is rotatable on one end of a hand lever 70 which is also operable from the pilot's seat 6 of the machine.

In operation, the engine 54 rotates the shafts 47 and 50 in opposite directions for turning the rotor 56 and the propeller 62 in opposite directions. By swinging the hand lever 65 upwardly or downwardly, all of the blades 57 of the rotor 56 may be feathered in unison as desired. When this occurs, the ring 64 elevates the ring 68 through the coil springs 69 for pushing upwardly on the rods 66 in a manner to rock the shafts 61 for adjusting the blades 57 in one direction. For adjusting the blades 57 in the opposite direction, the ring 64 is moved downwardly through the medium of the hand lever 65, thereby pulling downwardly on the rods 66 for rocking the shafts 61 in the opposite direction. By inclining the rockable ring 68 in any suitable direction through the medium of the lever 70, the blades 57 may be caused to feather at any point in the cycle thereof for causing the machine to travel in any desired direction. The rings 64 and 68 are rotatable on their respective operating levers 65 and 70. Links 71 (see Fig. 18) operatively connect the rockable shafts 61 to the rotor blades 57, said links being substantially similar to the links 42.

Referring now to the modification illustrated in Figures 19 to 23, inclusive, of the drawings, it will be observed that reference character 73 designates a tubular vertical outer shaft to be rotatably mounted in any suitable manner in the cabin of the machine. Journaled in bearings 74 in the outer shaft 73 and extending upwardly and downwardly therefrom is a tubular inner shaft 75 which is open at its ends. The shafts 73 and 75 are to be operatively connected to an engine in the cabin of the machine for rotation in opposite directions by means similar to that shown in Figure 14 of the drawings.

Fixed on the upper portion of the outer shaft 73 and rotatable about the upper portion of the inner shaft 75 is a rotor 76. The rotor 76 includes blades 77 on shafts 78 having one end portion journaled in bearings provided therefor on a spider 79 which is rotatably mounted on the upper portion of the inner shaft 75. Arms 80 are fixed on the shafts 78 of the blades 77. The rotor blades 77 are rockable on the outer ends of struts 81 which are fixed on the upper portion of the tubular outer shafts 73 and which extend radially and upwardly therefrom.

A propeller 82 is fixed on the upper portion of the tubular inner shaft 75 below the spider 79 and within the confines of the rotor 76.

A hand lever 83 is pivotally mounted for vertical swinging movement in the lower portion of the cabin of the machine. Pivotally mounted on one end of the lever 83 is an upstanding rod 84. A plate 85 is mounted for universal rocking movement on the upper end of the rod 84. Fixed to the plate 85 is an operating lever 86.

Rods 87, which are substantially similar structurally to the rods 80, are operable in the tubular inner shaft 75 and extend beyond the ends thereof. At their lower ends, the rods 87 are connected to the plate 85 by links 88 and universal joints 89. A plate 90 is mounted in a similar manner on the upper ends of the rods 87. Spiders 91 connect the upper and lower end portions of the rods 87 in a manner to permit vertical relative movement therebetween.

A spider 92 is rotatably mounted on the plate 90. Links 93 operatively connect the legs of the spider 92 to the arms 80 on the shafts 78 of the rotor blades 77. Pins 94 rise from the spider 79 and are slidably engaged in openings provided therefor in the spider 92 for connecting said spider 92 to said spider 79 for rotation in unison therewith.

In operation, the rotor 76 and the propeller 82 are turned in opposite directions by their respective shafts 73 and 75. By actuating the lever 83, the rods 87 are raised or lowered in unison for feathering all of the blades 77 of the rotor 76. By way of further explanation, the rods 77 move the plate 90 and the spider 92 vertically, said spider 92 actuating the shafts 78 of the rotor blades 77 through the links 93 and the arms 80. By inclining the plate 85 in the correct direction, the plate 90 and the spider 92 may be similarly inclined for causing the rotor blades 77 to feather at any point in the cycle thereof for causing the machine to travel in the desired direction. The spider 92 fits loosely on the pins 94 for permitting said spider to be tipped to any inclination. It will thus be seen that a helicopter comprising a rotor and propeller has been provided, said propeller operating within, above or below the rotor and turning in the opposite direction therefrom. The propeller functions as a reduction gear in addition to counteracting engine torque or twist. When the equalizing gear unit is used, it is unnecessary to have different sizes of gears as the propeller acts as a reduction gear, as above indicated, except to make the assembly work out. The propeller functions as a reduction gear when it is pulled against the rotor, as in this device.

It is believed that the many advantages of a helicopter constructed in accordance with the present invention will be readily understood, and although preferred embodiments of the machine are as illustrated and described, it is to be understood that further modifications and changes in the details of construction may be resorted to which will fall within the scope of the invention as claimed.

What is claimed is:

1. In a helicopter, the combination of a vertical shaft, a spider journaled for free rotation on the upper end of said shaft and having radial bearings, rotor blades having shafts journaled in said bearings, a propeller fixed on said shaft below said spider and rotor blades, a rotatable tubular member concentric with said shaft and at its upper end below said propeller, inclined struts providing a driving connection between the rotor blades and said tubular member, said propeller being located within the confines of said struts, said rotor blades being pivoted to the outer ends of said struts for rocking movement about axes parallel with the shafts of said blades, a vertically movable and universally tiltable member, operating connections between said last-named member and said rotor blades including rods rockably mounted on and extending longitudinally of the struts, manually operable means to move said last-named member vertically to simultaneously change the pitch of the rotor blades, manually operable means to tilt said last-named member for feathering the rotor blades at any point in their path of rotation, and means for driving said shaft and said tubular member in opposite directions.

2. In a helicopter, the combination of a vertical shaft, a spider journaled for free rotation on the upper end of said shaft and having radial bearings, rotor blades having shafts journaled in said bearings, a propeller fixed on said shaft below said spider and rotor blades, a rotatable tubular member concentric with said shaft and terminating at its upper end below said propeller, inclined struts providing a driving connection between the rotor blades and said tubular member, said propeller being located within the confines of said struts, said rotor blades being pivoted to the outer ends of said struts for rocking movement about axes parallel with the shafts of said blades, a vertically movable and universally tiltable member, operating connections between said last-named member and said rotor blades including rods rockably mounted on and extending longitudinally of the struts, manually operable means to move said last-named member vertically to simultaneously change the pitch of the rotor blades, manually operable means to tilt said last-named member for feathering the rotor blades at any point in their path of rotation, and means for driving said shaft and said tubular members in opposite directions, said two manually operable means including a second and lower vertically movable and universally tiltable member, rods operatively connecting said vertically movable and tiltable members, a lever for vertically moving the second vertically movable and tiltable member, and a second lever for tilting said second vertically movable and tiltable member.

WILLIAM T. TRICE.